United States Patent

Damman et al.

[15] 3,636,614
[45] Jan. 25, 1972

[54] WHEEL BUILDING MACHINE

[72] Inventors: Cornelis Damman, Nieuwkoop, Netherlands; Raymond Joseph Lawton, Beeston, England

[73] Assignee: Churchill Automatic Assembly Ltd.

[22] Filed: Sept. 29, 1969

[21] Appl. No.: 861,580

[30] Foreign Application Priority Data

Oct. 2, 1968  Great Britain.....................46,763/68

[52] U.S. Cl. ...............................29/211 R, 29/240, 157/1.5
[51] Int. Cl. .....................................B23q 7/10, B23p 19/04
[58] Field of Search....................29/208, 211 C, 211 R, 240; 157/1.5

[56] References Cited

UNITED STATES PATENTS 2,759,530  8/1956  Herr .......................................157/1.5

FOREIGN PATENTS OR APPLICATIONS

634,997  3/1950  Great Britain..........................157/1.5

*Primary Examiner*—Theron E. Condon
*Assistant Examiner*—Eugene F. Desmond
*Attorney*—Harry C. Bierman, Jordan B. Bierman and Bierman and Bierman

[57] ABSTRACT

An automatic spoked wheel building machine including a wheel rim and hub support structure arranged to clamp the rim and retain a spoked hub in position centrally of the rim whilst spokes are inserted in series in a succession of groups into receiving holes in the rim, the wheel rim and hub being indexed to bring a hole in the wheel rim into alignment with a nipple retaining head supplied with nipples successively. There being adjacent the nipple retaining head a motor-driven screwdriver bit adapted to be advanced and retracted towards and away from the rim to collect a nipple during advancement, locate it on the end of the spoke and screw it onto the spoke to a predetermined condition of tensioning of the spoke and then to retract whilst a successive spoke hole in the rim containing a spoke is brought to the nipple-receiving head to receive a nipple upon the next successive advancing movement of the screwdriver bit.

19 Claims, 9 Drawing Figures

WHEEL BUILDING MACHINE

This invention concerns a machine for automatically building a spoked wheel.

According to the invention a machine for automatically building a spoked wheel includes means for securing each of the wheel spokes in turn at the wheel rim and arranged so that the spokes are secured in position in a plurality of successive groups, the spokes of each group being secured at equal spacings around the wheel and successive groups being secured with different tensions therein, while maintaining the same tension in the spokes of each group.

The invention will be described further with reference to the several figures of the accompanying drawings which show several forms of the invention by way of example only and in which.

Figure 1:
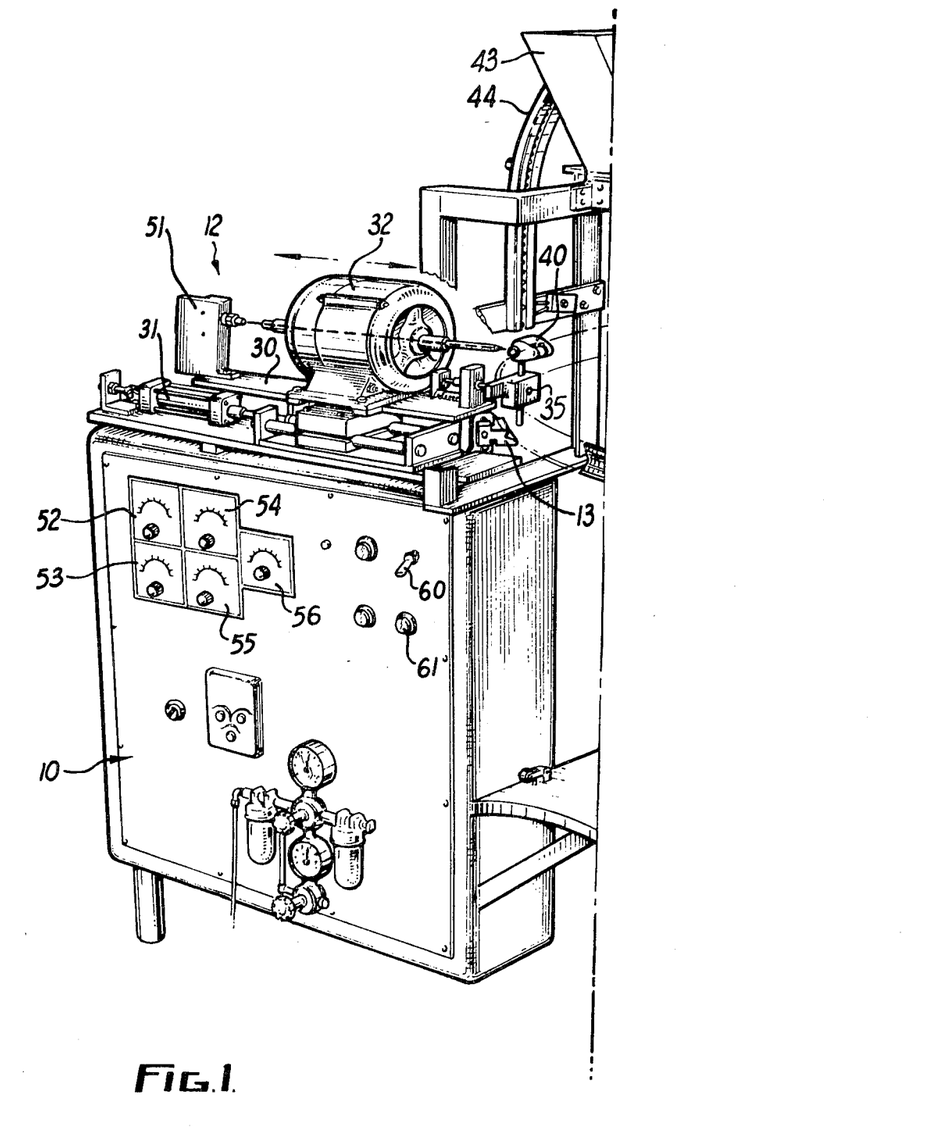
FIG. 1 and FIG. 1a show a perspective view of the machine in its entirety.
Figure 1A:
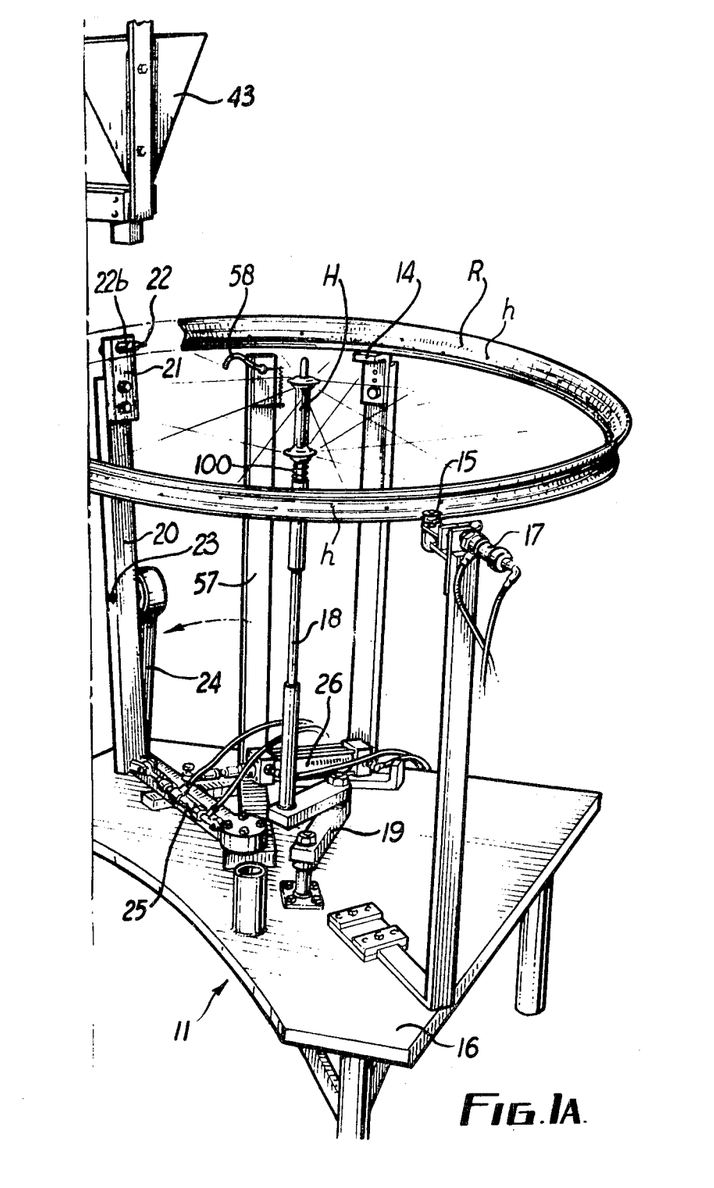
Figures 2, 3:
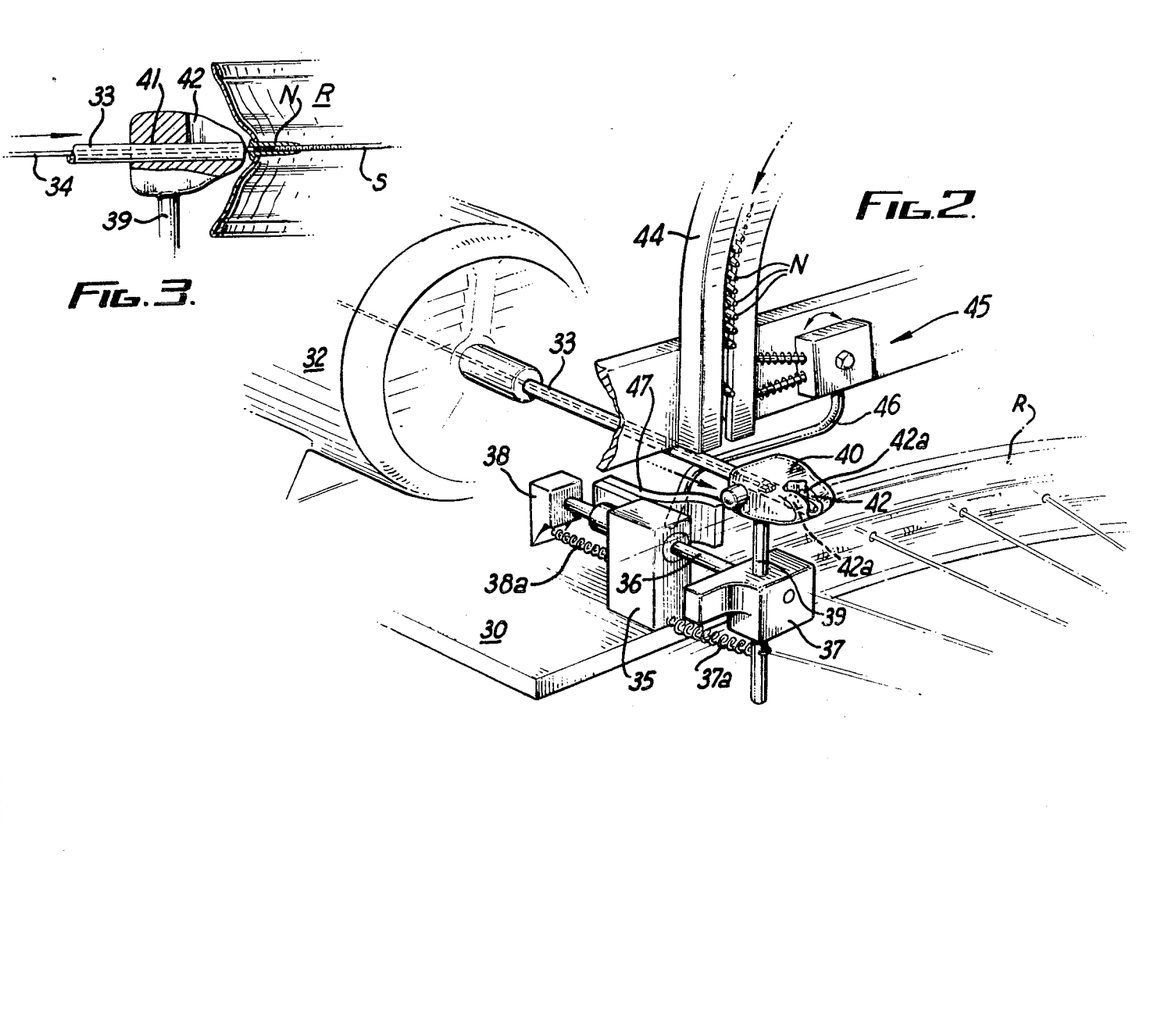
FIG. 2 shows a perspective view, on an enlarged scale, of the spoke nipple-manipulating arrangement provided on the machine of FIG. 1.
FIG. 3 shows a fragmentary cross section through part of the spoke-nipple manipulating arrangement of FIG. 2.

Referring to the drawings and firstly to FIG. 1 it will be seen that the machine generally comprises three parts, a control cabinet indicated at 10, a wheel rim supporting and manipulating assembly indicated at 11 and a spoke-nipple manipulating arrangement indicated at 12.

Figure 5:
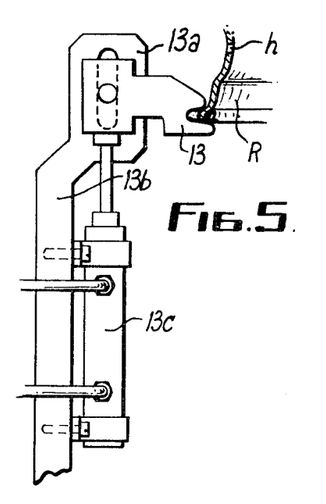
FIG. 5 shows in side elevation a detail of a further part of the machine.
Figure 6:
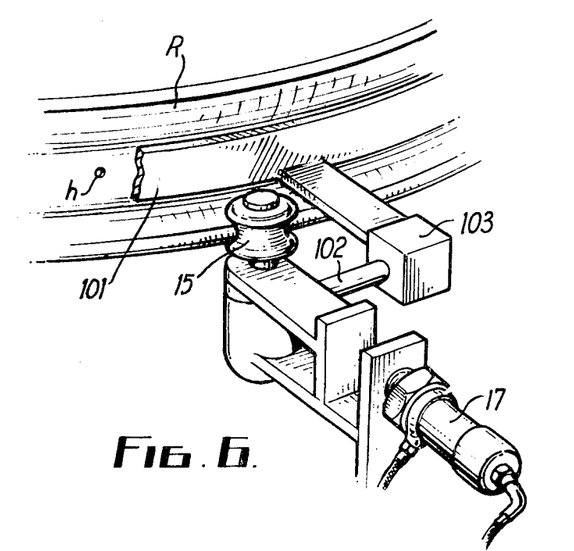
FIG. 6 is a scrap view of a part of the machine of FIG. 1 showing a modification.

The wheel rim supporting and manipulating assembly comprises three guides 13, 14 and 15 adapted to engage with the periphery of a wheel rim R at angularly spaced locations to support the rim in a generally horizontal plane at a position spaced above a baseplate 16. The guide 15 is adapted for movement towards and away from the periphery of the rim R under the action of a double-acting pneumatic or hydraulic cylinder generally indicated at 17. The baseplate 16 supports a center shaft 18 which is floatingly mounted on bracket means 19 and adapted to support a wheel hub H rotatably thereon in correct disposition with regard to a wheel rim held by the guides 13, 14 and 15. The guide 13 (see FIG. 5) is slidably mounted on a plate 13a located at the upper end of an arm 13b which carries a hydraulic or pneumatic cylinder 13c the ram of which is adapted to move the guide 13 upwardly or downwardly on the plate 13a to take account of the staggered disposition of the holes h in the wheel rim R. By means of this arrangement the wheel rim can be moved to ensure that a hole h can be lined up accurately with a nipple feed and positioning means 40 to be described below. If desired the guide 14 can be similarly mounted but in FIG. 1 a simple fixed guide is shown for convenience. Such a slidable guide 14 is used when the staggering of the holes h is relatively large but where the staggering is small a fixed guide can of course be used, as also can a fixed guide 13 but a fixed guide 13 can only be used in the case in which there is no staggering of the holes h.

Figure 4:
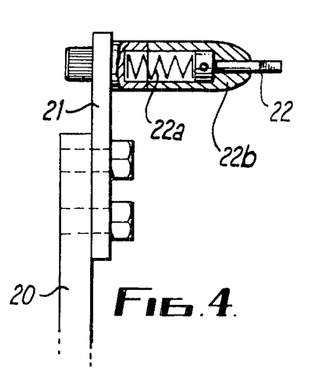
FIG. 4 shows in part section a detail of one part of the machine.

An arm 20 carrying a headpiece 21 having an inwardly directed pin 22 secured thereto is provided and pivotally mounted on a stud 23 secured to a support bracket 24. The pin 22 is provided with a flattened end so that it will contact a hole h where the staggering of the holes is small (say one-sixteenth inch). The pin 22 is spring-loaded by means of a spring 22a located in a housing 22b (see FIG. 4) so that should it strike the wheel rim R before entering a hole h (for example if the holes in the rim were not accurately spaced) the spring will compress and thus prevent the full force of a pin arm actuating cylinder 25 from becoming effective to cause the pin 22 to move the rim R against the clamping force of the cylinder 17. As the arm 20 is moved by cylinder 26 (as explained below) the pin will pick up the hole in the rim and move it to its correct position, i.e., in line with the nipple-feeding device explained below. The actuation of the cylinder 17 is explained below. In view of the ability to move the guide 14 the pin 22 can be accurately located in the hole h even in the case in which the staggering of the holes is relatively large.

The arm 20 is adapted to be pivoted about the stud 23 by means of a double-acting pneumatic or hydraulic cylinder 25 to move the pin 22 from a position wherein it may engage with a spoke hole h in the wheel rim R to a position wherein it is outwardly spaced from the rim R. The arm 20 is also adapted for arcuate movement around the periphery of the rim under the action of a double-acting pneumatic or hydraulic cylinder 26 which operates on the bracket 24.

Mounted above the control cabinet 10 is a platform 30 which is adapted to be reciprocated under the action of a double-acting pneumatic or hydraulic cylinder 31 in a radial direction with respect to the periphery of a wheel rim R supported in the guides 13 to 15. Secured to the platform 30 is a motor 32 adapted to drive a screwdriver bit generally indicated at 33. The screwdriver bit 33 is provided with an axial bore in which is located a probe 34 whose end projects outwardly from the end of the bit 33 remote from the motor 32. The action of the probe 34 will be referred to in more detail below. Mounted on the platform 30 at the end thereof adjacent to the wheel rim R is a block 35 having a bore therethrough which slidably receives a rod 36 having blocks 37 and 38 secured to its ends adjacent and remote from the wheel rim R respectively. Tension springs 37a and 38a are secured between the block 35 and blocks 37 and 38 respectively. The block 37 carries a stud 39 on whose upper end is mounted a spoke-nipple receiving and positioning member 40.

The member 40 has a bore 41 adapted to allow passage of the screwdriver bit therethrough and a passageway 42 in its upper surface adapted to receive a spoke-nipple N and position same in the bore 42. Within the bore 42 of the member 40 are located two spring-loaded clamping balls 42a one at each side of the bore, which serve to hold a nipple N in the bore in the correct position for engagement by the screwdriver bit 33.

Spoke-nipples N are stored in a hopper 43 forming part of a vibratory bowl centerboard hopper or other type of feeder adapted to feed the nipples N in proper orientation down a guide track 44 to a position where they can be dropped one at a time for reception by the passageway 42 by a metering gate device generally indicated at 45. The device 45 includes an actuating lever 46 adapted to be operated by a cam surface 47 secured to the platform 30.

In accordance with the invention the spokes S are secured in position in the wheel in a plurality of successive groups. The spokes of each group are inserted at equal spacings around the wheel and successive groups are secured with different tensions therein while the spokes of each group all have the same tension which ensures that the hub H is properly centered in the finished wheel.

In order to prevent the spokes from moving relative to the rim R (while the nipples thereon are not tightly held in position, that is during the initial building of the wheel) to such an extent as to allow the nipples to become clear of the holes h and thus become located in a position such that they can jam against the rim R the hub of the wheel is resiliently loaded upwardly by means of a spring 100 carried at the upper end of the center shaft 18. This ensures that the spokes are held in such a position as to ensure that the nipples remain in the holes. As the wheel-building program continues the spring is compressed due to the tightening of the groups of spokes in the rim R.

Alternatively a semicircular band 101 may be mounted on arm 102 extending from the clamp 15. The band is held by a block 103 at the end of the arm 102. The band 101 is adapted to lie in close proximity with that part of the wheel rim R in which the holes h are located thereby to prevent movement outwardly of the spokes and thus retain the nipples in the holes $h$ until such time as sufficient spokes are present to prevent movement thereof relative to the rim R.

The precise program of the machine can be varied to suit individual requirements and the various working parts of the machine are controlled in accordance with the chosen program by control equipment of conventional kind which will not be described in detail disposed within the cabinet 10.

In this example the wheel contains 32 spokes and these are inserted in four successive groups of eight spokes.

In use an operator switches on the motor and the air or hydraulic fluid is supplied to both sides of the piston in cylinder 17 thus to move the guide 15. The result of supplying cylinder 17 with fluid to each side of the piston is to provide a small net force acting on the guide 15 to move it towards a wheel rim R. The force is overcome by the operator when he locates the wheel rim R in position and it serves, when the rim is located, to hold it against the guides 13 and 14. When the probe 34 first actuates the sensing device 51 (as will be explained below) fluid is exhausted from the cylinder 17 at that side of the piston nearer the rim R and thus the full clamping force of the fluid is exerted against the rim via the clamp 15. This action takes place at the completion of an indexing movement of the rim (referred to below) or at the commencement of a time delay initiated by the device 51 referred to below. One of the spoke holes $h$ is now brought into alignment with the screwdriver bit 33 by the operator. The hub H is preprepared with all 32 spokes in the holes thereof and hanging loosely from the hub H. Power supply for the machine is provided when the switch 60 is closed and the building operation is commenced after pressing button 61, which causes the ram of cylinder 25 to pivot on arm 20 to cause the pin 22 to enter a hole in the rim to be located in alignment with the screwdriver bit 33 after the rim has been moved. The ram of cylinder 26 is now moved to cause correct alignment of the hole into which the spoke is to be inserted with the screwdriver bit 33. Pin 22 now retracts and becomes repositioned to be inserted into a successive hole, i.e., four holes away, the movements of the pin 22 and the rim R being caused by the operation of cylinders 25 and 26. While the pin 22 is being retracted the platform 30 is moved towards the rim R by the ram of cylinder 31. The operator now raises the first spoke and positions it in alignment with the hole $h$ opposite the bit 33 for location in the nipple located in the bore 42 of the member 40.

The platform 30 carries the member 40 and the nipple contained therein forwardly to enable the probe to be located in the nipple and to cause the latter to move into engagement with the periphery of the rim R to arrest motion of the member 40. The platform 30 continues its traverse to feed the screwdriver bit, which is rotating, through the member 40, and into engagement with the nipple N. The overrun of the platform relative to the member 40 is taken up by the springs 37a and 38a. The nipple N is screwed onto the spoke end by the action of the advancing and rotating bit 33. After a certain number of turns the end of the probe 34 will contact the end of the spoke S and this is sensed by a device 51 on account of the push exerted on the probe 34 due to the continued screwing of the nipple N. The device 51 now causes retraction of the screwdriver bit 33 by actuation of the cylinder 31 after a predetermined time delay which can be adjusted by means of a potentiometer 52 on the control cabinet. At the same time as the screwdriver bit 33 is being retracted the headpiece 21 is moved in order that the pin 22 is moved to become located in a hole in the rim R four holes from that into which a spoke has just been located and the cycle of operation is recommenced automatically and repeats itself until all of the spokes are secured in position in the rim R, at which time the machine stops.

As the platform 30 is retracted at the end of a nipple screwing operation the cam surface 47 actuates the lever 46 to operate the device 45 thereby allowing a nipple N to drop into the bore 42 to be held by the balls 42a in alignment with the bore 41. The cycle continues for the insertion of the first eight spokes and three successive groups of eight spokes are then inserted in like manner, the operation of the arm 20 being suitably controlled from the control cabinet to index the wheel rim as appropriate prior to fixing of each spoke. The time delay between the end of the probe 34 sensing the end of a spoke S and the retraction of the screwdriver bit 33 may be increased or decreased before fixing of the second group of eight spokes and increased or decreased still further before fixing of the third group of eight spokes and yet further before fixing of the fourth group of eight spokes in order to enable the required number of turns of the screwdriver bit to be made to achieve the correct spoke tension in the spokes of each of the four groups. The time delays for the second to fourth groups of spokes can be set by the potentiometers 53, 54 and 55 respectively, a potentiometer 56 being provided as a master delay control common to all four groups.

A post 57 is provided extending upwardly from the baseplate 16 and has at its upper end a switch device 58 adapted to be actuated by spokes S passing thereover. The switch device 58 operates in connection with the switch device 51. When the screwdriver bit 33 is retracted after rotating a nipple in a hole in the rim R and the lever 58 is pushed downwardly by an already secured spoke (which can only occur when the eighth spoke of a group is being secured) two actions take place. The first is that the pin 22 actuated by cylinder 26 will ride over the fourth hole due to a nipple being already in that hole. Since pin 22 passes the fourth hole it will become located in the next free hole adjacent the screwdriver bit. Secondly the securing of each spoke of the four series of eight spokes is controlled by one of the potentiometers 52 to 55 these will become operative sequentially, commencing with potentiometer 52, and will be actuated by the switch devices 51 and 58.

It will be appreciated that the longer the time delay between the probe 34 sensing the end of the spoke S and the retracting of the screwdriver, the greater the tension with which that spoke is secured.

Figure 7:
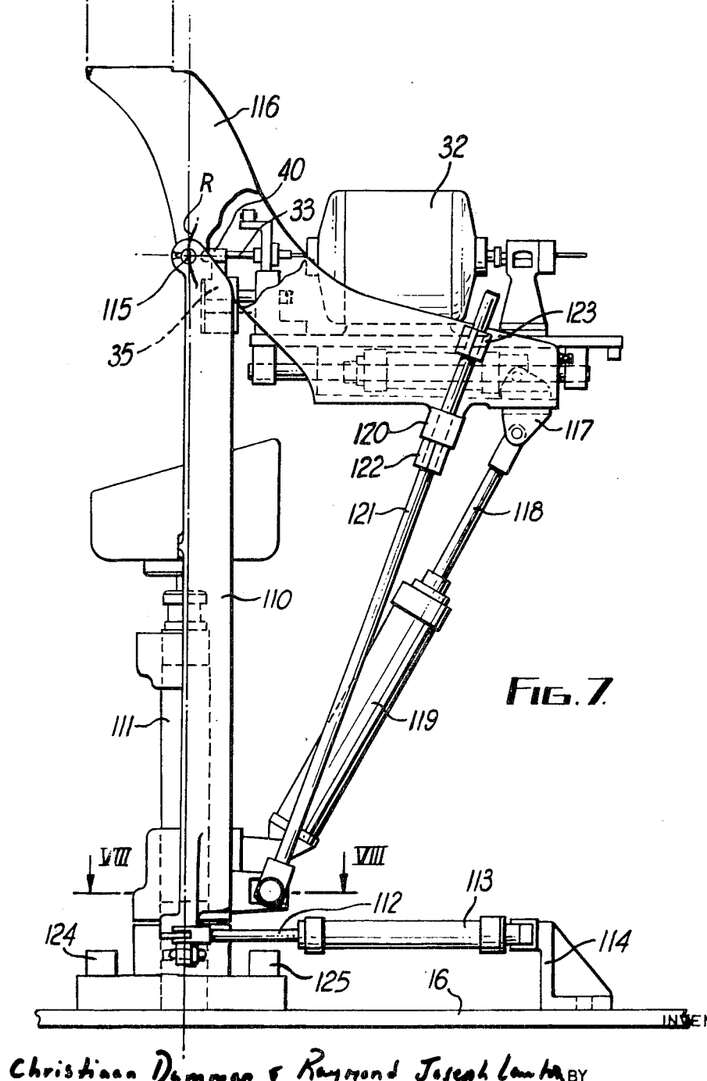
FIG. 7 is an elevation, with parts broken away, showing a further modification.
Figure 8:
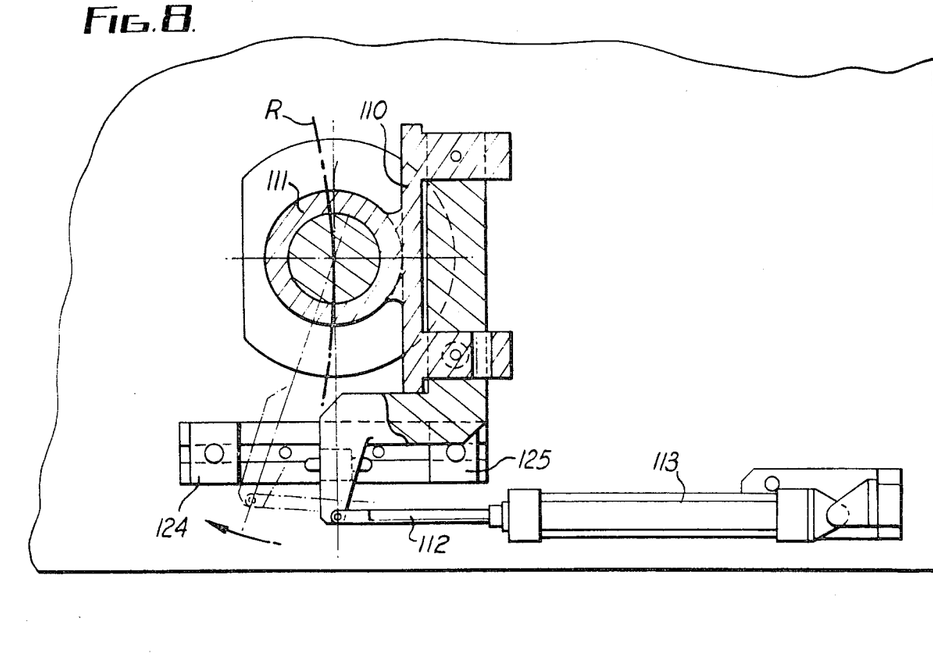
FIG. 8 is a sectional view on the line VIII—VIII of FIG. 7.

Referring now to FIGS. 7 and 8 which show a modification of the machine it will be seen that it is possible to mount the nipple feed hopper and its associated track and spoke nipple receiving and positioning means, together with the electric motor 32 and its slidable platform and actuating ram 30 in a universally movable manner. As shown in FIG. 7 there is provided a yoke 110 rotatably mounted on a pivot shaft 111 which itself is carried on the baseplate 16 of the machine. The yoke member has attached to one side thereof, the ram 112 of a hydraulic cylinder 113 carried by a bracket 114, which is also mounted on a baseplate 16. At the upper end of each arm of the yoke 110 is a pivot pin 115, the longitudinal axes of these pins are aligned and the axis is adapted to be moved as will be explained below to a position in which it is in line with a hole $h$ in the wheel rim R. Carried on the pivot pins 115 is a saddle member 116 which carries the baseplate upon which is mounted the cylinder 30 and the slides for the motor 32. Also mounted on the arms of the saddle and extending upwardly therefrom is the framework (not shown) which carries the hopper 43, nipple guide track 44 and spoke nipple receiving and positioning member 40. It will be evident that by virtue of this arrangement that the motor 32 and the associated cylinder 30 together with the hopper 43 and the spoke nipple receiving and positioning member can be pivoted about a vertical axis by means of the ram 112 and thus the screwdriver bit 33 is always aligned with the hole $h$ in the wheel rim R.

In order to provide universal adjustment of the position of the screwdriver bit 33, the saddle 116 has at its rearward extremity a bracket 117 to which is pivotally attached the ram 118 of a hydraulic or pneumatic cylinder 119 which is itself pivotally mounted on the base of the yoke 110. It follows, therefore, that the saddle 116 can be pivoted about the axes of the pins 115 and thus this pivotal movement, together with that controlled by the ram 112 provides universal movement for the yoke and saddle.

In order to limit the pivotal movement of the saddle about the pins 115, the saddle is provided with a collar 120 through which passes a strut 121. Adjustably mounted on the strut 121 and positioned at either side of the collar 120 are a pair of stops 122 and 123. These stops may be locked on the strut at any desired spacing to define therebetween a predetermined distance through which the collar may move. Clearly since it is possible to locate the stops 122 and 123 in abutment with the opposite ends of the collar 120, the latter and thus the saddle can be located in any fixed position, in which case, the saddle would not be movable by the ram 118 and thus the saddle and its associated motor 32 and hopper 43 together with the spoke nipple receiving and positioning member can be fixed at any position against pivotal movement in a vertical arc, while still allowing pivotal movement in a horizontal plane under the influence of the ram 112.

Conveniently the amount of pivotal movement of the yoke in the horizontal plane is limited by the provision of the baseplate 16 of a pair of stops 124 and 125, and again, if desired, these stops may be so positioned as to fix the yoke against pivotal movement in the horizontal plane.

By virtue of the provision of the universal movement of the motor and its associated elements, it is possible, whatever the position in space of the wheel rim R and thus the holes $h$, to ensure that the screwdriver bit and the nipples when located in the positioning member 40 can be accurately aligned to ensure correct positioning of the nipples on the screw ends of the spokes S during a wheel building operation.

One of the advantages of this arrangement lies in the fact that wheels of different diameter can be built on the machine and compensation for the angle of the spokes can be achieved by adjustment of the position of the yoke and saddle to ensure that the screwdriver bit and nipple can be aligned with the end of the spoke so that when the nipple is being screwed onto the spoke the screwdriver bit can correctly enter the screwdriver slot in the nipple.

If desired the position of the hub relative to the rim R can be moved to alter the angle of the spoke so that it will be correctly aligned to receive the nipple and the screwdriver bit can thus correctly enter the screwdriver slot in the nipple so that it is possible to build wheels of different sizes on a machine not provided with a positionally adjustable motor and associated parts as just described. In such an arrangement the hub would be mounted on a vertically adjustable center shaft of the baseplate.

When building a wheel on this machine it is necessary, if the nipple is fed through the rim before the spoke is in position, for the operator to bend the spoke slightly in order to present the threaded spoke end into the nipple. On small wheels with short spokes, the stiffness of the spokes makes this difficult and means are provided on this machine whereby the nipple feed mechanism 12 may be arrested just before the nipple enters the rim and then allowed to move forward when the spoke is in position. These movements are controlled by the operator who, by operating a foot valve, either by pneumatic means stops the piston rod of cylinder 31 in midstroke allowing it to continue when the spoke is in position, or alternatively, advances or retracts as required the physical stop between slide 30 and the fixed base by means of a pneumatic or hydraulic cylinder.

It will be appreciated that it is not intended to limit the invention to the above example only, many variations being possible such as might readily occur to one skilled in the art both in the design of the machine itself and the program which it effects, without departing from the scope thereof.

We claim:

1. A machine for automatically building a spoked wheel including screwdriver means for securing each of the wheel spokes in turn at the wheel rim, rim rotating means, actuating means for said rim rotating means arranged so that said rim is rotated intermittently to enable spokes to be secured in position in a plurality of successive groups, the spokes of each group being secured at equal spacings around the wheel, and means for controlling the screw action of said screwdriver means such that successive groups of spokes are secured with different tensions therein, while maintaining the same tension in the spokes of each group.

2. A machine as claimed in claim 1 in which said screwdriver means for securing the spokes is in the form of a screwdriver bit, a spoke nipple receiving and positioning member arranged to lie in close proximity with a wheel rim spoke hole, a mounting means for said screwdriver bit to retain same in axial alignment with said spoke nipple receiving and positioning member, means for driving, advancing and retracting said screwdriver bit relative to said nipple receiving and positioning member and nipple holding means arranged to hold said nipple in position until it is to be screwed onto a spoke.

3. A machine as claimed in claim 2 including a nipple supply hopper, a nipple guide track for said hopper arranged to feed nipples from said hopper to said nipple receiving and positioning member, nipple clamping means in said nipple receiving and positioning member to retain the nipple until it is to be screwed onto a spoke by means of the screwdriver bit.

4. A machine as claimed in claim 2 including a motor, mounting means thereon for said screwdriver bit, a platform for said motor, guide rails for said platform, means for causing sliding motion of said platform on said guide rails to enable said platform to be advanced or retracted, said advancing and retracting movement of said platform being radially relative to a wheel rim of a wheel to be built.

5. A machine as claimed in claim 2 including means for retaining a wheel rim and hub, said means including a plurality of rim-retaining arms, one of said rim-retaining arms being provided adjacent said spoke nipple receiving and positioning member, and means for indexing said rim during a wheel-building operation successively to enable spokes of a group to be secured to the wheel rim in a predetermined sequence.

6. A machine as claimed in claim 5 in which said means for retaining the wheel rim comprises three arms, a rim clamping member on each of said arms, a double-acting cylinder on one arm at least of said three arms adapted to apply a small net pressure to said wheel rim clamping member of said at least one arm to cause said wheel rim to be retained against the other clamps and thus be positioned to receive spoke nipples as said rim is successively indexed past said nipple receiving and positioning member.

7. A machine as claimed in claim 5 in which said indexing device includes an arm, an indexing pin on said indexing arm, a pivot for said arm to allow it to pivot in a vertical arc towards and away from said wheel rim, means for moving said arm bodily in a horizontal arc to enable said indexing pin to be entered into a nipple-receiving hole in said rim and subsequently to move said rim bodily during an indexing operation.

8. A machine as claimed in claim 5 including an indexing arm and a pair of fluid cylinders for said indexing arm to enable said indexing arm to be moved to move and rim bodily during an indexing operation.

9. A machine as claimed in claim 5 in which said indexing device includes an indexing arm, an indexing pin on said indexing arm, a housing for said indexing pin, a spring in said housing loading said indexing pin to ensure that in the event of misalignment with a nipple-receiving hole in said rim the pin will first strike the rim and, as the indexing arm moves will pick up the hole and index the rim to the correct position at the same time.

10. A machine as claimed in claim 5 including a hub-receiving arm, a resilient means on said hub-receiving arm at its hub-receiving end, said resilient means supporting said hub to hold it in position to ensure that spokes upon which nipples have been screwed are held with said nipples in said holes in said rim against dislodgement therefrom during the initial stages at least of a wheel-building operation when said spokes are only relatively loosely held in said rim by their nipples.

11. A machine as claimed in claim 6 in which said rim-clamping member controlled positionally by said double-acting cylinder comprises an arm, a mounting block carrying said arm, and a semicircular band on said arm arranged to lie in close proximity with said wheel rim on that face against which a head of said spoke nipples abut whereby the nipples are held against dislodgement from the holes in the wheel rim at least during the initial stages of a wheel-building operation.

12. A machine as claimed in claim 1 in which said means for controlling the screw action of said screwdriver means is carried on a mounting means, said mounting means being universally movable on a yoke, a spoke nipple receiving and positioning member on said mounting means, ram and cylinder means for said yoke being provided to move said yoke and thus said mounting means to enable said screwdriver means and said spoke nipple receiving and positioning member to be moved thus to ensure correct screwing of said spoke nipple onto said spoke and to compensate for the angularity of said spoke relative to said wheel rim.

13. A machine as claimed in claim 12 including a motor for rotation of said screwdriver bit to enable screwing of the nipple onto the spoke to be achieved, a slidable platform for said motor, a nipple receiving and positioning member on said platform, slides for said platform, a subplatform carrying said slides, a saddle for said subplatform, pivot means on said saddle and said subplatform to enable said subplatform to pivot in a vertical arc, ram and cylinder means for pivoting said subplatform in said vertical arc and means for pivoting said saddle in a horizontal arc to provide universal movement of said screwdriver bit and said nipple receiving and positioning member.

14. A machine as claimed in claim 12 including mounting means having a saddle, a yoke for said saddle, pivot means between said yoke and said saddle to allow pivotal movement of said saddle about a center arranged to be aligned with a hole in said wheel rim about to receive a nipple, a pivot shaft for said yoke for allowing movement of said yoke in a horizontal arc about a center aligned with a hole in said wheel rim about to receive a nipple.

15. A machine as claimed in claim 12 including mounting means having a saddle, a yoke for said saddle, pivot means between said yoke and said saddle, a pneumatic or hydraulic ram and cylinder for said saddle, said cylinder being mounted on said yoke and said ram being connected to said saddle at a point remote from said pivot means, a strut mounted on said yoke, a collar on said saddle to receive said strut, adjustable stops on said strut at each side of said collar on said saddle, thereby to limit pivotal movement of said saddle or to lock it against pivotal movement in any desired angular position.

16. A machine as claimed in claim 12 including mounting means having a saddle, a yoke for said saddle, pivot means between said yoke and said saddle, pneumatic or hydraulic ram and cylinder means for pivoting said yoke, said cylinder being mounted on a fixed part of said machine and said ram being attached to said yoke at a position offset from said pivot, adjustable stops mounted on said fixed part of said machine and located at each side of said ram where said ram is connected to said yoke thereby to limit the pivotal movement of said yoke, or to lock it in any desired angular position.

17. A machine according to claim 1 in which probe means is provided in said screwdriver means, said probe means serving to sense the presence of a spoke as said nipple is screwed thereon.

18. A machine according to claim 2 including nipple locating means in said spoke nipple receiving and positioning member, a bore in said spoke nipple receiving and positioning member, said nipple locating means comprising two spring-loaded balls, one on each side of said bore of said spoke nipple receiving and positioning member.

19. A machine as claimed in claim 5 in which at least one of said arms is provided with a clamp positionally adjustable in a vertical or near vertical plane on its arm, means for raising and lowering said positionally adjustable clamp relative to its arm thus to enable the rim to be raised and lowered, an indexing means on said rim retaining arm adjacent said spoke nipple receiving and positioning member to be entered into a spoke nipple receiving hole in said rim to enable said rim to be indexed during a wheel-building operation.

* * * * *